US012569856B2

(12) United States Patent
Zhang

(10) Patent No.: US 12,569,856 B2
(45) Date of Patent: Mar. 10, 2026

(54) NANO-SAND MILL WITH STATIC DISCHARGE AT TAIL END OF TURBINE

(71) Applicant: GUANGDONG HUAHUI INTELLIGENT EQUIPMENT CO., LTD., Dongguan City (CN)

(72) Inventor: Siyuan Zhang, Dongguan City (CN)

(73) Assignee: GUANGDONG HUAHUI INTELLIGENT EQUIPMENT CO., LTD., Dongguan City (CN)

( * ) Notice: Subject to any disclaimer, the term of this patent is extended or adjusted under 35 U.S.C. 154(b) by 394 days.

(21) Appl. No.: 18/077,483

(22) Filed: Dec. 8, 2022

(65) Prior Publication Data

US 2023/0256454 A1 Aug. 17, 2023

(30) Foreign Application Priority Data

Feb. 16, 2022 (CN) ......................... 202210143202.6

(51) Int. Cl.
*B02C 17/18* (2006.01)
*B02C 17/04* (2006.01)
*B02C 23/36* (2006.01)

(52) U.S. Cl.
CPC .......... *B02C 17/1805* (2013.01); *B02C 17/04* (2013.01); *B02C 17/1855* (2013.01); *B02C 23/36* (2013.01)

(58) Field of Classification Search
CPC . B02C 17/1805; B02C 17/1855; B02C 17/04; B02C 17/002; B02C 17/06; B02C 17/10; B02C 17/16; B02C 17/163; B02C 17/166; B02C 17/1835; B02C 17/184; B02C 23/36; B02C 25/00; B02C 2210/01; B07B 1/54

(Continued)

(56) References Cited

FOREIGN PATENT DOCUMENTS

| | | |
|---|---|---|
| CN | 108144701 A | 6/2018 |
| CN | 109225488 A | 1/2019 |

(Continued)

OTHER PUBLICATIONS

Machine translation of CN-213434827-U (Year: 2021).*
Machine translation of CN-110249780-B (Year: 2021).*
Machine translation of CN-108144701-A (Year: 2018).*

*Primary Examiner* — Christopher L Templeton
*Assistant Examiner* — Teresa A Guthrie
(74) *Attorney, Agent, or Firm* — Muncy, Geissler, Olds & Lowe, P.C.

(57) ABSTRACT

Disclosed is a nano-sand mill with static discharge at the tail end of a turbine, including a main body and a screen box. The screen box is fixedly installed at a bottom of the main body, a top surface of the screen box is provided with a through hole, the screen box is communicated with a discharge chamber of the main body through the through hole, an annular mounting plate is fixedly installed on an inner side surface of the screen box, a screen is fixedly installed between inner side surfaces of the annular mounting plate, and a dredging mechanism is provided inside the annular mounting plate. Through the dredging mechanism, a plurality of dredging marbles can continuously strike the screen to quickly dredge the screen, shaking out materials blocked on the screen, and the surfaces of the dredging marbles grind materials blocked on the lower surface of the screen.

4 Claims, 6 Drawing Sheets

(58) Field of Classification Search
USPC .................................... 241/69; 209/357, 382
See application file for complete search history.

(56) References Cited

FOREIGN PATENT DOCUMENTS

| | | | | |
|---|---|---|---|---|
| CN | 209156043 | U | * | 7/2019 |
| CN | 110249780 | A | | 9/2019 |
| CN | 112495755 | A | | 3/2021 |
| CN | 213434827 | U | * | 6/2021 |

* cited by examiner

NANO-SAND MILL WITH STATIC DISCHARGE AT TAIL END OF TURBINE

CROSS-REFERENCE TO RELATED APPLICATIONS

This application claims the benefit of Chinese Patent Application No. 202210143202.6, filed on Feb. 16, 2022 in the National Intellectual Property Administration of China, the disclosure of which is incorporated herein by reference in its entirety.

TECHNICAL FIELD

The present application relates to the technical field of sand grinding equipment, in particular to a nano-sand mill with static discharge at the tail end of a turbine.

BACKGROUND

Sand mill, also known as bead mill, is mainly used for wet grinding of chemical liquid products. It can be roughly divided into horizontal sand mill, basket sand mill, vertical sand mill, etc. It is composed of a main body, a grinding drum, a sand grinding disc, a grinding medium, a motor, and a feeding pump. The feeding speed is controlled by the feeding pump. The grinding medium of this equipment is generally divided into zirconia beads, glass beads, zirconium silicate beads, etc.

The granted application patent with the publication number CN109225488A discloses a sand mill. The sand mill is provided with at least two movable filter discs, so the at least two movable filter discs can be used alternately. When one of the movable filter discs is blocked, other movable filter discs can be used, and the blocked movable filter disc is moved to a cleaning chamber for cleaning. However, this sand mill needs to be stopped when it is required to replace the filter disc. During the process of replacing the filter disc, the materials cannot be unloaded through the filter disc. Moreover, the replacement timing of the filter disc cannot be determined by the actual use state of the filter disc, and only regular replacement can be performed, resulting in that the blocked filter disc cannot be monitored in real time. The feed efficiency is further reduced.

In view of the above technical problems, the present application proposes a solution.

SUMMARY OF THE INVENTION

An objective of the present application is to solve the problem of low unloading efficiency caused by the need to stop the existing sand mill to replace the filter disc and the inability to monitor the blockage of the filter disc in real time during discharging, and propose a type of nano-sand mill with static discharge at the tail end of a turbine.

The objective of the present application can be achieved by the following technical solutions. A type of nano-sand mill with static discharge at the tail end of a turbine, including a main body and a screen box, wherein the screen box is fixedly installed at a bottom of the main body, a top surface of the screen box is provided with a through hole, the screen box is communicated with a discharge chamber of the main body through the through hole, an annular mounting plate is fixedly installed on an inner side surface of the screen box, a screen is fixedly installed between inner side surfaces of the annular mounting plate, and a dredging mechanism is provided inside the annular mounting plate; and the dredging mechanism includes a dredging box, a side surface of the dredging box is fixedly connected with a connecting frame, two symmetrical rotating shafts are movably connected between a front inner wall and a back inner wall of the dredging box, a rotating roller is fixedly installed on an outer surface of the rotating shaft, evenly distributed installation sleeves are fixedly installed on an outer surface of the rotating roller, evenly distributed bumps are fixedly installed on an outer surface of the installation sleeve, a drive box for driving the two rotating shafts is fixedly installed on a front surface of the dredging box, two sets of symmetrical limit sleeves penetrate and are fixedly connected with an inner top wall of the dredging box, a protruding rod is movably connected between inner rings of the limit sleeve, a connecting block is fixedly installed on a bottom of the protruding rod, a bottom of the connecting block is in contact with a top surface of the bump, a second spring is fixedly installed between a top surface of the connecting block and the inner top wall of the dredging box, and a dredging marble is fixedly installed on a top of the protruding rod.

As a preferred embodiment of the present application, a discharge pipe is fixedly installed on the screen box, a bottom of the screen box is communicated with a top of the discharge pipe, the discharge pipe is arranged horizontally, one end of the discharge pipe is sealed, a material pump is arranged between inner walls of the other end of the discharge pipe, an inner bottom wall of the discharge pipe is hinged with an unloading inclined plate, and a first spring is fixedly installed between a bottom surface of the unloading inclined plate and the inner bottom wall of the discharge pipe.

As a preferred embodiment of the present application, front ends of the two rotating shafts both pass through the inner wall of the dredging box and extend to the interior of the drive box, a transmission gear is fixedly installed on outer surfaces of ends of the two rotating shafts located inside the drive box, the two transmission gears are engaged with each other, a micromotor is fixedly installed on a front inner wall of the drive box through two motor seats, and an output end of the micromotor is fixedly connected to the front end of one of the rotating shafts.

As a preferred embodiment of the present application, a processor is also provided on an outer grinding cylinder, and the processor is communicatively connected with a discharge monitoring module, an abnormality analysis module, a storage module, a controller, and a dredging monitoring module;

the discharge monitoring module is intended to monitor and analyze a discharge speed of the main body: an angle value of an included angle between the unloading inclined plate and the inner bottom wall of the discharge pipe is obtained through an angle sensor and marked as an included angle value JD, included angle thresholds JDmin and JDmax are obtained through the storage module, where JDmin is the minimum included angle threshold and JDmax is the maximum included angle threshold, and the included angle value JD is compared with the included angle thresholds JDmin and JDmax: if JD≤JDmin, it is determined that the discharge is abnormal, and the discharge monitoring module sends a primary abnormality signal to the abnormality analysis module; if JDmin<JD<JDmax, it is determined that the discharge is normal, and the discharge monitoring module sends a normal discharge signal to the processor; and if JD≥JDmax, it is determined that the discharge is abnormal, and the discharge monitoring module sends a secondary abnormality signal to the abnormality analysis module.

As a preferred embodiment of the present application, upon receiving the primary abnormality signal, the abnormality analysis module generates a maintenance signal and sends the maintenance signal to the processor, upon receiving the maintenance signal, the processor sends the maintenance signal to a mobile phone terminal of an administrator, and upon receiving the maintenance signal, the administrator checks the screen and the unloading inclined plate for faults respectively; and upon receiving the secondary abnormality signal, the abnormality analysis module detects and analyzes blockage of the screen, and sends a dredging signal to the processor when the screen is blocked, upon receiving the dredging signal, the processor sends the dredging signal to the controller, and upon receiving the dredging signal, the controller controls the micromotor to start.

As a preferred embodiment of the present application, a specific process of detecting and analyzing the blockage of the screen includes: a pressure value of an inner wall of the discharge chamber is obtained through a pressure sensor disposed on the inner wall of the discharge chamber and marked as YL, a speed value of a spindle is obtained through a speed sensor and marked as ZS, and a discharge coefficient CL is obtained by calculating YL and ZS; and a discharge threshold CLmin is obtained through the storage module, and the discharge coefficient CL is compared with the discharge threshold CLmin: if the discharge coefficient CL is less than or equal to the discharge threshold CLmin, it is determined that the screen is not blocked, and the abnormality analysis module sends a normal discharge signal to the processor; and if the discharge coefficient CL is greater than the discharge threshold CLmin, it is determined that the screen is blocked.

As a preferred embodiment of the present application, the dredging monitoring module is intended to monitor and analyze a dredging efficiency of the dredging mechanism: time-keeping is performed after the micromotor is started, a time when the micromotor is started is marked as a start time, a time when the included angle value JD is reduced to the included angle threshold JDmax is marked as an end time, the start time is subtracted from the end time to obtain a dredging duration, a difference value between the included angle value JD and the angle threshold JDmax is marked as an angle difference value, a ratio of the angle difference value and the dredging duration is marked as a dredging efficiency, a dredging threshold is obtained through the storage module, and the dredging efficiency is compared with the dredging threshold: if the dredging efficiency is less than or equal to the dredging threshold, it is determined that the dredging efficiency is unqualified, and the dredging monitoring module sends a dredging abnormality signal to the processor; and if the dredging efficiency is greater than the dredging threshold, it is determined that the dredging efficiency is qualified, and the dredging monitoring module sends a normal dredging signal to the processor.

Compared with the prior art, the present application has the following beneficial effects.

1. Through the dredging mechanism, a plurality of dredging marbles can continuously strike the screen to quickly dredge the screen, shaking out the materials blocked on the screen, and at the same time, the surfaces of the dredging marbles grind the materials on the lower surface of the screen. The unblocked part of the screen can perform unloading normally during the dredging process. No shutdown in required in the dredging process, thus ensuring the unloading continuity of the equipment and further improving the unloading efficiency.
2. Real-time monitoring of the unloading speed of the screen is realized through the discharge monitoring module, feedback of the unloading speed is realized through the inclination angle of the unloading inclined plate, and the state of the screen is analyzed with different analysis methods respectively when the unloading speed is too fast and the unloading speed is too slow, in order to prevent the phenomenon that the screen is damaged and the unloading speed is too fast and the screen cannot screen the materials. At the same in time, the blockage of the screen can be monitored in real time. The screen is dredged at the first time when it is blocked, thereby further improving the unloading efficiency.
3. Through the dredging monitoring module, the dredging efficiency of the dredging mechanism can be detected and analyzed. When the dredging efficiency is unqualified, the screen and the dredging mechanism can be repaired in time to prevent the dredging efficiency from being reduced due to the failure of the dredging mechanism. The operating state of the dredging mechanism is monitored, and the dredging efficiency of the dredging mechanism and the unloading efficiency of the screen are improved.

BRIEF DESCRIPTION OF THE DRAWINGS

In order to facilitate understanding by those skilled in the art, the present application will be further described below with reference to the accompanying drawings.

Figure 1:
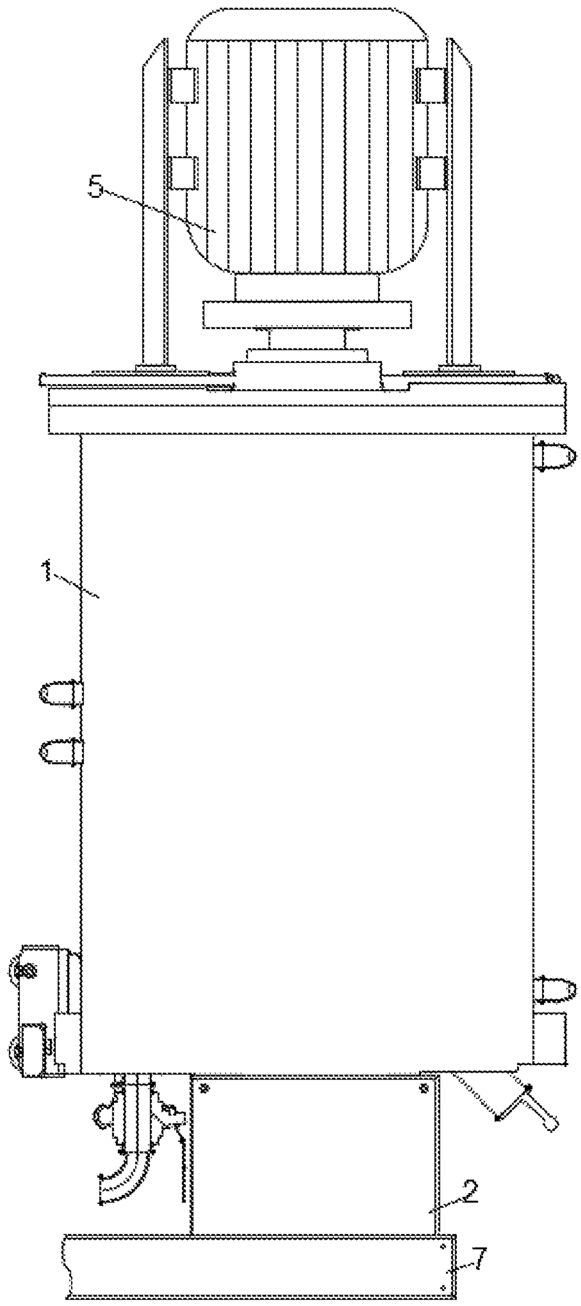
FIG. 1 is a front view of the structure of Embodiment 1 of the present application.
Figure 2:
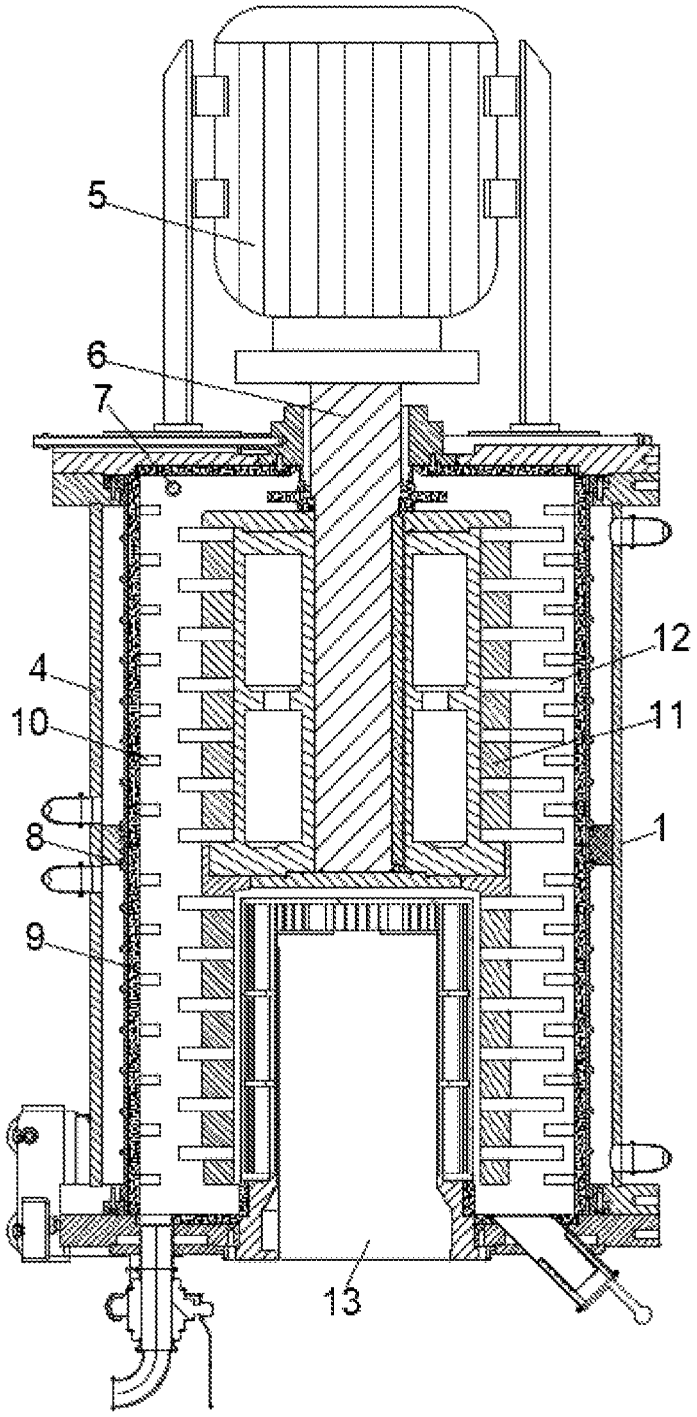
FIG. 2 is a front cross-sectional view of the structure of a main body in Embodiment 1 of the present application.
Figure 3:
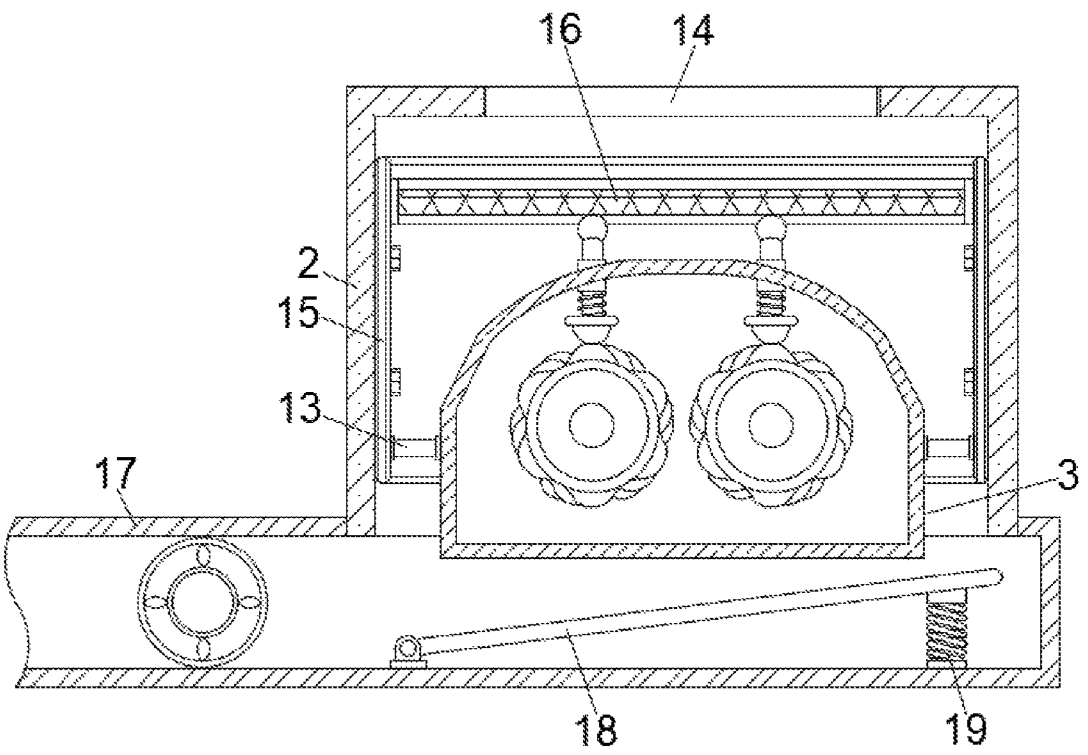
FIG. 3 is a front cross-sectional view of the structure of a screen box in Embodiment 1 of the present application.
Figure 4:
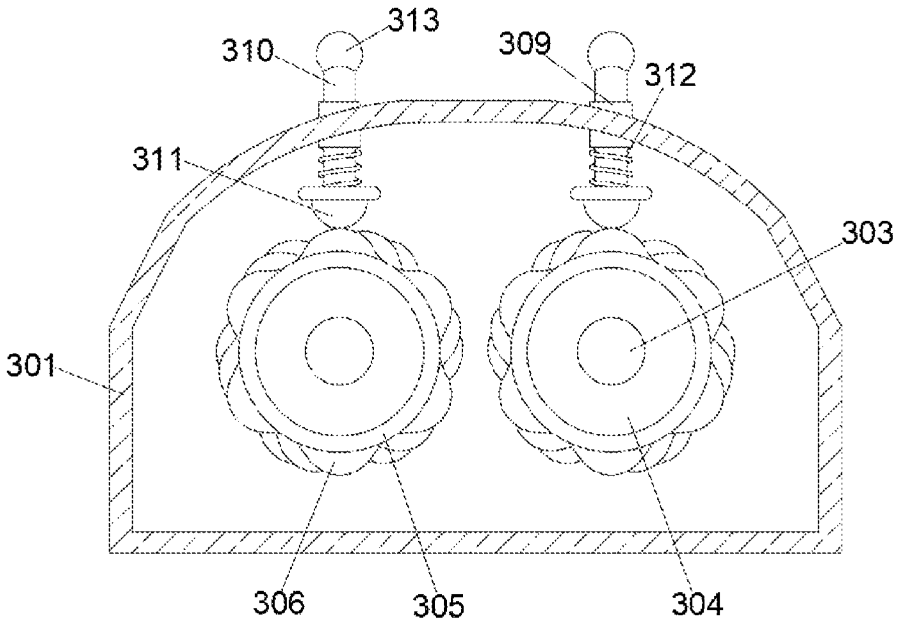
FIG. 4 is a front cross-sectional view of the structure of a dredging box in Embodiment 1 of the present application.
Figure 5:
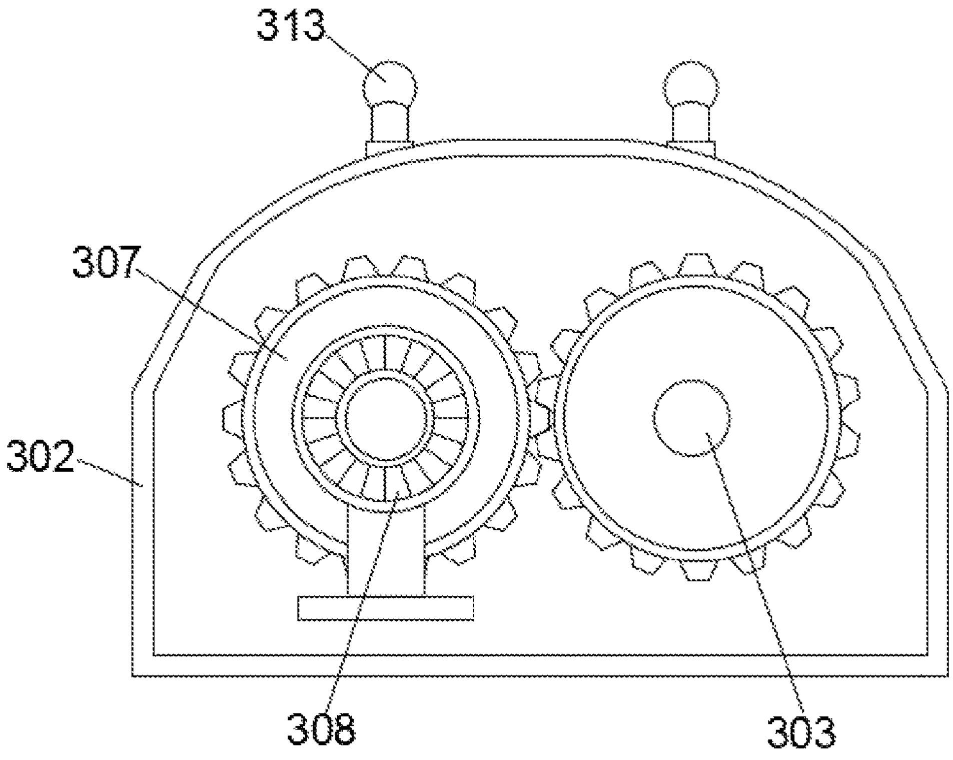
FIG. 5 is a front cross-sectional view of the structure of a drive box in Embodiment 1 of the present application.
Figure 6:
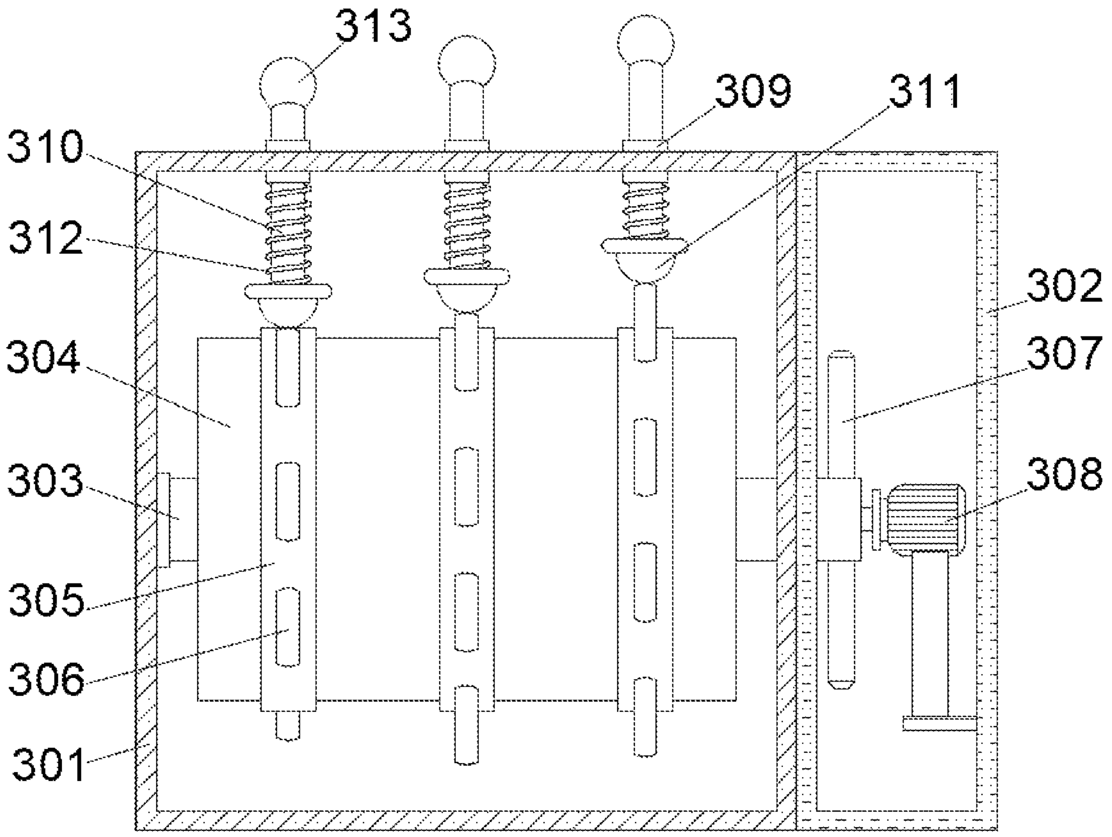
FIG. 6 is a left cross-sectional view of the structure of a dredging mechanism in Embodiment 1 of the present application.

In the figures: 1. main body; 2. screen box; 3. dredging mechanism; 301, dredging box; 302, drive box; 303, rotating shaft; 304, rotating roller; 305, installation sleeve; 306, bump; 307, transmission gear; 308, micromotor; 309, limit sleeve; 310, protruding rod; 311, connecting block; 312, second spring; 313, dredging marble; 4, outer grinding cylinder; 5, drive motor; 6, spindle; 7. feeding pipe; 8. annular fixing seat; 9. inner grinding cylinder; 10. grinding nail; 11. grinding roller; 12. rod pin; 13. discharge chamber;

14. through hole; 15. annular installation plate; 16, screen; 17, discharge pipe; 18, unloading inclined plate; 19, first spring.

DETAILED DESCRIPTION OF THE EMBODIMENTS

The technical solutions of the present application will be clearly and completely described below with reference to the embodiments. Obviously, the described embodiments are only a part of the embodiments of the present application, rather than all the embodiments. Based on the embodiments of the present application, all other embodiments obtained by those of ordinary skill in the art without creative efforts shall fall within the protection scope of the present application.

Embodiment 1

Referring to FIGS. 1-6, a type of nano-sand mill with static discharge at the tail end of a turbine includes a main body 1 and a screen box 2. The main body 1 includes an outer grinding cylinder 4. A drive motor 5 is fixedly installed on a top of the outer grinding cylinder 4 through two motor seats. A spindle 6 is fixedly installed at an output end of the drive motor 5. A bottom of the spindle 6 passes through an inner wall of the outer grinding cylinder 4 and extends to the interior of the outer grinding cylinder 4. The inner wall of the outer grinding cylinder 4 is fixedly connected with a feed pipe 7. An annular fixing seat 8 is disposed between inner side walls of the outer grinding cylinder 4. An inner grinding cylinder 9 is fixedly installed between inner rings of the annular fixing seat 8. Evenly distributed grinding nails 10 are disposed on an inner wall of the inner grinding cylinder 9. A new type of cylinder with convex grinding nails 10 increases the strength and service time of the cylinder, makes materials strike the grinding cylinder in a larger area under the condition of high-speed centrifugal motion, and improves the dispersion effect. A grinding roller 11 is fixedly installed on an outer surface of an end of the spindle 6 located inside the inner grinding cylinder 9. Evenly distributed rod pins 12 are fixedly installed on an outer surface of the grinding roller 11. The rod pins 12 are made of high wear-resistant and high-strength ceramic materials, with a long service life. The rod pins 12 are arranged crosswise with the grinding roller 11. A discharge chamber 13 is provided inside the outer grinding cylinder 4.

The screen box 2 is fixedly installed at a bottom of the main body 1. A top surface of the screen box 2 is provided with a through hole 14. The screen box 2 and the discharge chamber 13 of the main body 1 are communicated through the through hole 14. Materials in the discharge chamber 13 directly enter the screen box 2 through the through hole 14. An annular mounting plate 15 is fixedly installed on an inner side surface of the screen box 2. The annular mounting plate 15 is intended to fix the screen 16 and a dredging mechanism 3. The screen 16 is fixedly installed between inner side surfaces of the annular mounting plate 15. Evenly distributed connecting frames are fixedly installed on an inner side surface of the annular mounting plate 15. The dredging mechanism 3 is fixed between ends of the evenly distributed connecting frames away from the annular mounting plate 15. The dredging mechanism 3 is intended to dredge the screen 16. A discharge pipe 17 is fixedly installed on the screen box 2. A bottom of the screen box 2 is communicated with a top of the discharge pipe 17. The discharge pipe 17 is arranged horizontally. One end of the discharge pipe 17 is sealed. A material pump is arranged between inner walls of the other end of the discharge pipe 17. An unloading inclined plate 18 is hinged with an inner bottom wall of the discharge pipe 17. The unloading speed is fed back through an inclination angle of the unloading inclined plate 18, such that when the speed is too fast or too slow, an early warning and abnormality analysis are performed in time. A first spring 19 is fixedly installed between a bottom surface of the unloading inclined plate 18 and the inner bottom wall of the discharge pipe 17. The first spring 19 is intended to provide an elastic support for the unloading inclined plate 18.

The dredging mechanism 3 includes a dredging box 301. A side surface of the dredging box 301 is fixedly connected with the connecting frame. Two symmetrical rotating shafts 303 are movably connected between a front inner wall and a back inner wall of the dredging box 301. A rotating roller 304 is fixedly installed on an outer surface of the rotating shaft 303. Evenly distributed installation sleeves 305 are fixedly installed on an outer surface of the rotating roller 304. The number of the installation sleeves 305 is not less than three. The installation sleeves 305 correspond to limit sleeves 309 one-to-one. That is, several limit sleeves 309 are respectively installed directly above several installation sleeves 305. Evenly distributed bumps 306 are fixedly installed on an outer surface of the installation sleeve 305. A drive box 302 is fixedly installed on a front surface of the dredging box 301. Front ends of the two rotating shafts 303 pass through the inner wall of the dredging box 301 and extends to the interior of the drive box 302. A transmission gear 307 is fixedly installed on outer surfaces of ends of the two rotating shafts 303 located inside the drive box 302. The two transmission gears 307 are engaged with each other. A micromotor 308 is fixedly installed on a front inner wall of the drive box 302 through two motor seats. The micromotor 308 and the two transmission gears 307 drive the two rotating shafts 303 to rotate synchronously and in opposite directions. While the rotating shaft 304 is rotating, the plurality of bumps 306 on the outer surface of the installation sleeve 305 make a protruding rod 310 reciprocate in a vertical direction, so as to dredge the screen 16 by continuously striking the screen 16 with a dredging marble 313. Moreover, a plurality of dredging marbles 313 contact with the screen 16 at a different time, thereby further speeding up the frequency of the screen 16 being struck, such that the efficiency of dredging the screen 16 is further improved. An output end of the micromotor 308 is fixedly connected with the front end of one of the rotating shafts 303. Two sets of symmetrical limit sleeves 309 penetrate and are fixedly connected with an inner top wall of the dredging box 301. The limit sleeves 309 are in one-to-one correspondence with the installation sleeves 305. The protruding rod 310 is movably connected between inner rings of the limit sleeve 309. A connecting block 311 is fixedly installed at a bottom of the protruding rod 310. A bottom of the connecting block 311 is in contact with a top surface of the bump 306. A second spring 312 is fixedly installed between a top surface of the connecting block 311 and the inner top wall of the dredging box 301. The second spring 312 is sleeved on an outer surface of the protruding rod 310. A gap exists between an inner ring of the second spring 312 and the outer surface of the protruding rod 310. The dredging marble 313 is fixedly installed on a top of the protruding rod 310. Several dredging marbles 313 are located on the same set of limit sleeves 309 at difference heights. Through the design of different heights at the initial position, the plurality of dredging marbles 313 strike the screen 16 at a different time, the frequency of the screen 16 being struck is accelerated, and the dredging efficiency is greatly improved.

Embodiment 2

In the above embodiment, the screen 16 can be dredged during the unloading process by the dredging marbles 313 striking the screen 16, which speeds up the dredging efficiency of the screen 16, but the blockage of the screen 16 cannot be monitored. Therefore, the timing of dredging cannot be automatically selected according to the blockage of the screen 16, and dredging cannot be performed at the first time when the screen 16 is blocked.

Figure 7:
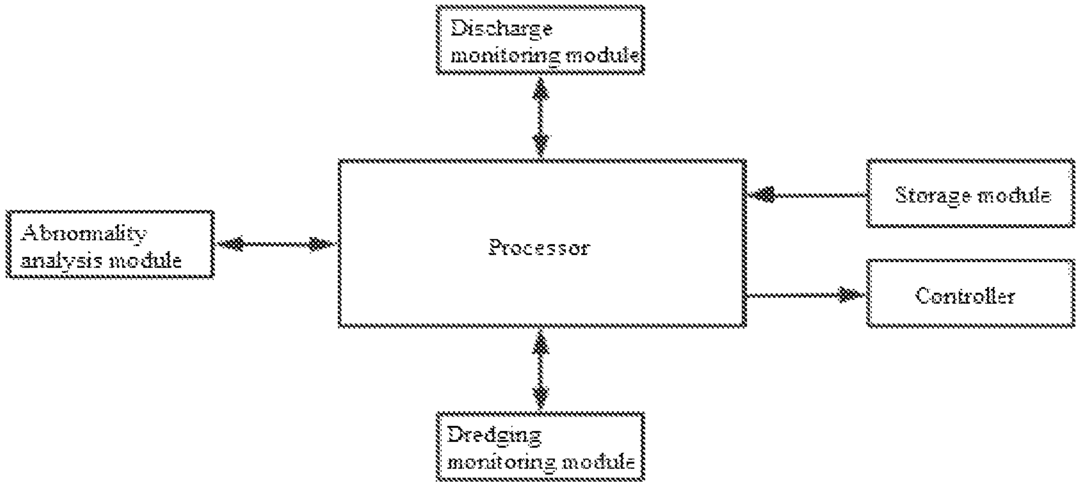
FIG. 7 is a schematic block diagram of Embodiment 2 of the present application.

Referring to FIG. 7, the outer grinding cylinder 4 is also provided with a processor. The processor is communicatively connected with a discharge monitoring module, an abnormality analysis module, a storage module, a controller, and a dredging monitoring module.

The discharge monitoring module is intended to monitor and analyze a discharge speed of the main body 1. An angle value of an included angle between the unloading inclined plate 18 and the inner bottom wall of the discharge pipe 17 is obtained through an angle sensor and marked as an angle value JD. Included angle thresholds JDmin and JDmax are obtained through the storage module, where JDmin is the minimum included angle threshold, and JDmax is the maximum included angle threshold. The included angle value JD is compared with the included angle thresholds JDmin and JDmax. If JD≤JDmin, it means that the unloading speed is too fast, and the screen 16 may be damaged in this case. Once the screen 16 is damaged, materials will be discharged directly without being screened, and therefore, the grinding effect of the discharged materials cannot be guaranteed. It is determined that the discharge is abnormal, and the discharge monitoring module sends a primary abnormality signal to the abnormal analysis module. If JDmin<JD<JDmax, it is determined that the discharge is normal, and the discharge monitoring module sends a normal discharge signal to the processor. If JD≥JDmax, it means that the unloading speed is too slow, and it is very likely that the screen 16 is blocked in this case. Therefore, it is necessary to analyze the reason for the slow unloading speed through the abnormality analysis module. It is determined that the discharge is abnormal, and the discharge monitoring module sends a secondary abnormality signal to the abnormality analysis module.

Upon receiving the primary abnormality signal, the abnormality analysis module generates a maintenance signal and sends the maintenance signal to the processor. Upon receiving the maintenance signal, the processor sends the maintenance signal to a mobile phone terminal of an administrator. Upon receiving the maintenance signal, the administrator checks the screen 16 and the unloading inclined plate 18 for faults respectively. The fault check here is mainly carried out on whether the screen 16 is damaged and whether the first spring 19 can be normally extended and retracted.

Upon receiving the secondary abnormality signal, the abnormality analysis module detects and analyzes the blockage of the screen 16. A pressure value of an inner wall of the discharge chamber 13 is obtained through a pressure sensor arranged on the inner wall of the discharge chamber 13 and marked as YL. A speed value of the spindle 6 is obtained through a rotational speed sensor and marked as ZS. A discharge coefficient CL is obtained by a formula $CL=\alpha1\times YL+\alpha2+\times ZS$. The discharge coefficient CL is a value that reflects the possibility that the discharge speed being too slow is caused by reasons other than the blockage of the screen 16. The higher the value of the discharge coefficient CL, the lower the possibility that the discharge speed being too slow is caused by reasons other than the blockage of the screen 16. The lower the value of the discharge coefficient CL, the lower the possibility that the discharge speed being too slow is caused by the blockage of the screen 16. $\alpha1$ and $\alpha2$ are proportional coefficients, $\alpha1>\alpha2>1$. A discharge threshold CLmin is obtained through the storage module, and the discharge coefficient CL is compared with the discharge threshold CLmin. If the discharge coefficient CL is less than or equal to the discharge threshold CLmin, it is determined that the screen 16 is not blocked, and the abnormality analysis module sends a normal discharge signal to the processor. If the discharge coefficient CL is greater than the discharge threshold CLmin, it is determined that the screen 16 is blocked, and the abnormality analysis module sends a dredging signal to the processor. Upon receiving the dredging signal, the processor sends the dredging signal to the controller. Upon receiving the dredging signal, the controller controls the micromotor 308 to start, such that the plurality of dredging marbles 313 continuously strike the screen 16 to dredge the screen 16 quickly, shaking out the materials blocked on the screen 16, and at the same time the surfaces of the dredging marbles 313 grind the materials blocked on the lower surface of the screen 16.

The dredging monitoring module is intended to monitor and analyze a dredging efficiency of the dredging mechanism 3. Time-keeping is performed after the micromotor 308 is started. A time when the micromotor 308 is started is marked as a start time. A time when the included angle value JD is reduced to the included angle threshold JDmax is marked as an end time. The start time is subtracted from the end time to obtain a dredging duration. A difference value between the included angle value JD and the angle threshold JDmax is marked as an angle difference value. A ratio of the angle difference value to the dredging duration is marked as a dredging efficiency. The dredging efficiency is a value that reflects the working efficiency of the dredging mechanism 3. The higher the value of the dredging efficiency, the higher the working efficiency of the dredging mechanism 3. The dredging threshold is obtained through the storage module, and the dredging efficiency is compared with the dredging threshold. If the dredging efficiency is less than or equal to the dredging threshold, it is determined that the dredging efficiency is unqualified, and the dredging monitoring module sends a dredging abnormality signal to the processor. If the dredging efficiency is greater than the dredging threshold, it is determined that the dredging efficiency is qualified, and the dredging monitoring module sends a normal dredging signal to the processor.

Embodiment 3

Figure 8:
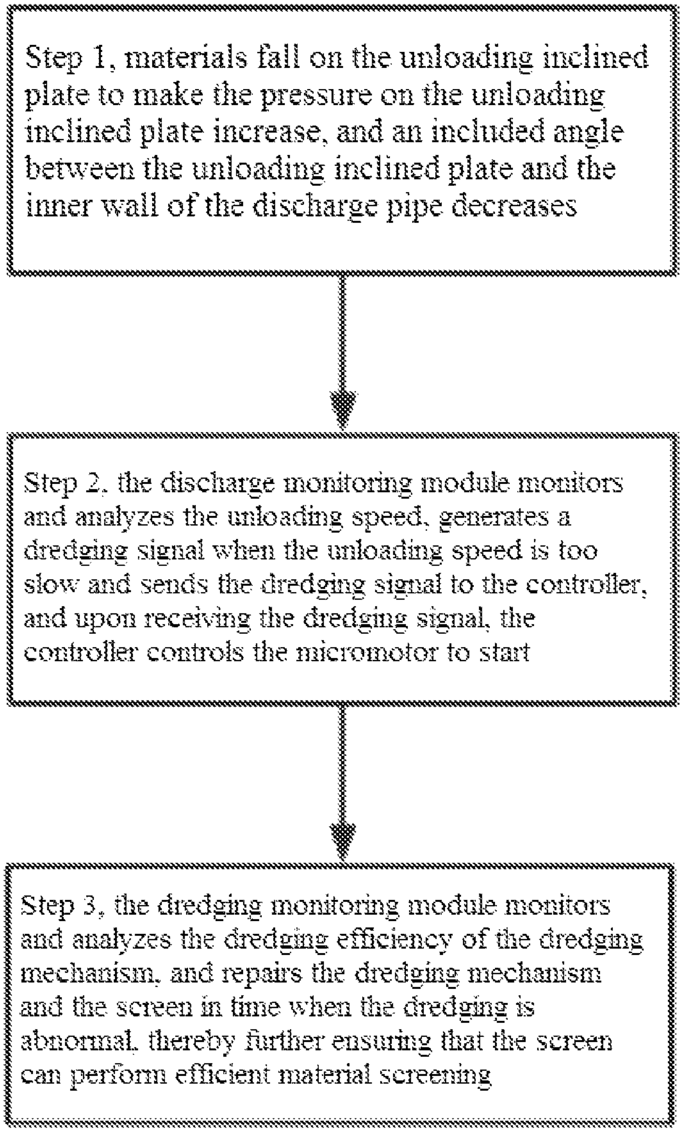
FIG. 8 is a flowchart of a method according to Embodiment 3 of the present application.

Referring to FIG. 8. a discharge process of a type of nano-sand mill with static discharge at the tail end of a turbine includes the following steps.

In step 1, materials in the main body 1 enter into the screen box 2 through the discharge chamber 13, the ground materials are screened by the screen 16 and then fall on the unloading inclined plate 18 to make the pressure on the unloading inclined plate 18 increase, and an included angle between the unloading inclined plate 18 and the inner wall of the discharge pipe 17 decreases.

In step 2, the discharge monitoring module monitors and analyzes the unloading speed through the angle value of the included angle between the unloading inclined plate 18 and the inner wall of the discharge pipe 17, and generates a dredging signal when the unloading speed is too slow and sends the dredging signal to the controller. Upon receiving the dredging signal, the controller controls the micromotor 308 to start. The micromotor 308 drives the two rotating shafts 303 to rotate synchronously and in opposite directions through the two transmission gears 307. The two rotating rollers 304 also synchronously rotate in opposite directions. The protruding rod 310 reciprocates in the vertical direction through the rotating bumps 306, and the movement trajectories of the plurality of protruding rods 310 are different, such that the plurality of dredging marbles 313 continuously strike the screen 16, so as to dredge the blocked screen 16 to ensure the screening efficiency of the screen 16.

In step 3, the dredging monitoring module monitors and analyzes the dredging efficiency of the dredging mechanism 3, and repairs the dredging mechanism 3 and the screen 16 in time when the dredging is abnormal, thereby further ensuring that the screen 16 can perform efficient material screening.

The above formulas are obtained by collecting a large amount of data for software simulation and a formula that is close to real values is selected. The coefficients in the formula are set by those skilled in the art according to the actual situation, such as formula CL=α1×YL+α2+×ZS. Those skilled in the art collect a plurality of groups of sample data and sets a corresponding discharge coefficient for each group of sample data, substitute the set discharge coefficient and the collected sample data into the formula, with any two formulas forming a binary linear equation system, and sort the calculated coefficients and average the same to obtain the values of α1 and α2 being 3.78 and 2.37, respectively.

The size of the coefficient is a specific value obtained by quantifying each parameter, which is convenient for subsequent comparison. The size of the coefficient depends on the amount of sample data and the corresponding discharge coefficients preliminarily set for each group of sample data by those skilled in the art, as long as it does not affect a proportional relationship between the parameter and the quantized value. For example, the discharge coefficient is proportional to the pressure value.

When the present application is in use, the discharge monitoring module monitors the discharge speed of the screen 16 in real time, feeds back the unloading speed through the inclination angle of the unloading inclined plate 18, and analyzes the state of the screen 16 by different analysis methods when the unloading speed is too fast or the unloading speed is too slow, which can monitor the blockage of the screen 16 in real time and dredge the screen 16 at the first time when the screen 16 is blocked. When the screen 16 is blocked, the micromotor 308 is started to make the plurality of dredging marbles 313 continuously strike the screen 16 to quickly dredge the screen 16, shaking out the materials blocked on the screen 16, and at the same time the surfaces of the dredging marbles 313 grind the materials on the lower surface of the screen 16.

The above-disclosed preferred embodiments of the present application are provided only to help illustrate the present application. The preferred embodiments do not describe all the details and do not limit the present application to specific embodiments. Obviously, many modifications and variations are possible in light of the content of this specification. This specification selects and specifically describes these embodiments in order to better explain the principles and practical applications of the present application, such that those skilled in the art can well understand and utilize the present application. The present application is to be limited only by the claims and their full scope and equivalents.

What is claimed is:

1. A nano-sand mill with static discharge at a tail end of a turbine, comprising a main body and a screen box, wherein the screen box is fixedly installed at a bottom of the main body, a top surface of the screen box is provided with a through hole, the screen box is communicated with a discharge chamber of the main body through the through hole, an annular mounting plate is fixedly installed on an inner side surface of the screen box, a screen is fixedly installed between inner side surfaces of the annular mounting plate, and a dredging mechanism is provided inside the annular mounting plate; and the dredging mechanism comprises a dredging box, a side surface of the dredging box is fixedly connected with a connecting frame, two symmetrical rotating shafts are disposed in the dredging box and movably connected between a front inner wall and a back inner wall of the dredging box, a rotating roller is fixedly installed on an outer surface of the rotating shaft, evenly distributed installation sleeves are fixedly installed on an outer surface of the rotating roller, evenly distributed bumps are fixedly installed on an outer surface of one of the installation sleeves, a drive box for driving the two rotating shafts is fixedly installed on the front inner wall of the dredging box, two sets of symmetrical limit sleeves penetrate and are fixedly connected with a top wall of the dredging box, wherein the limit sleeves are respectively disposed directly above the installation sleeves, a protruding rod is movably coupled with and penetrates one of the limit sleeves, a connecting block is fixedly installed on a bottom of the protruding rod, a bottom of the connecting block is in contact with top surfaces of the bumps, a second spring is fixedly installed between a top surface of the connecting block and the inner top wall of the dredging box, wherein the second spring is sleeved on an outer surface of the protruding rod, and a dredging marble is fixedly installed on a top of the protruding rod.

2. The nano-sand mill with static discharge at the tail end of a turbine according to claim 1, wherein a discharge pipe is fixedly installed on the screen box, a bottom of the screen box is communicated with a top of the discharge pipe, the discharge pipe is arranged horizontally, one end of the discharge pipe is sealed, a material pump is arranged between inner walls of the other end of the discharge pipe, an inner bottom wall of the discharge pipe is hinged with an unloading inclined plate, and a first spring is fixedly installed between a bottom surface of the unloading inclined plate and the inner bottom wall of the discharge pipe.

3. The nano-sand mill with static discharge at the tail end of a turbine according to claim 2, wherein front ends of the two rotating shafts both pass through the front inner wall of the dredging box and extend to the interior of the drive box, a transmission gear is fixedly installed on outer surfaces of ends of the two rotating shafts located inside the drive box, the two transmission gears are engaged with each other, a micromotor is fixedly installed on a front inner wall of the drive box through two motor seats, and an output end of the micromotor is fixedly connected to the front end of one of the rotating shafts.

4. The nano-sand mill with static discharge at the tail end of a turbine according to claim 3, wherein a processor is also provided on an outer grinding cylinder, and the processor is communicatively connected with a discharge monitoring module, an abnormality analysis module, a storage module, a controller, and a dredging monitoring module;

the discharge monitoring module is intended to monitor and analyze a discharge speed of the main body: an angle value of an included angle between the unloading inclined plate and the inner bottom wall of the discharge pipe is obtained through an angle sensor and marked as an included angle value JD, included angle thresholds JDmin and JDmax are obtained through the storage module, where JDmin is the minimum included angle threshold and JDmax is the maximum included angle threshold, and the included angle value JD is compared with the included angle thresholds JDmin and JDmax: if JD≤JDmin, it is determined that the discharge is abnormal, and the discharge monitoring module sends a primary abnormality signal to the abnormality analysis module; if JDmin<JD<JDmax, it is determined that the discharge is normal, and the discharge monitoring module sends a normal discharge signal to the processor; and if JD≥JDmax, it is determined that the discharge is abnormal, and the discharge monitoring module sends a secondary abnormality signal to the abnormality analysis module.

* * * * *